United States Patent [19]
Chalin

[11] Patent Number: 5,634,655
[45] Date of Patent: Jun. 3, 1997

[54] SUSPENSION SYSTEM INCLUDING AN INTEGRALLY FORMED AXLE SEAT

[75] Inventor: Thomas N. Chalin, Garland, Tex.

[73] Assignee: Watson & Chalin Manufacturing, Inc., McKinney, Tex.

[21] Appl. No.: 665,376

[22] Filed: Jun. 19, 1996

[51] Int. Cl.$^6$ ................................................ B60G 11/26
[52] U.S. Cl. .................... 280/712; 280/711; 280/713; 267/241; 267/31; 267/32
[58] Field of Search .................................... 280/712, 711, 280/713, 698, 702, 718, 699; 267/241, 31, 32, 229, 256

[56] References Cited

U.S. PATENT DOCUMENTS

| 3,782,753 | 1/1974 | Sweet et al. | 267/241 X |
| 3,844,579 | 10/1974 | Cunha | 280/718 |
| 3,960,389 | 6/1976 | Narahari | 267/32 X |
| 3,966,223 | 6/1976 | Carr | 280/712 |
| 5,328,159 | 7/1994 | Kaufman et al. | 280/718 X |
| 5,332,258 | 7/1994 | Büttner | 280/704 |
| 5,427,404 | 6/1995 | Stephens | 280/712 |

FOREIGN PATENT DOCUMENTS

| 2272407 | 5/1994 | United Kingdom | 280/713 |

Primary Examiner—Christopher P. Ellis
Attorney, Agent, or Firm—Konneker & Smith, P.C.

[57] ABSTRACT

A suspension system including an integrally formed axle seat provides reduced suspension system maintenance, increased reliability, reduced number of parts, reduced stress on axles, reduced manufacturing cost, and more convenient assembly as compared to conventional suspension systems. In a preferred embodiment, a suspension system has a hanger attachable to a vehicle frame, a bushing received in the hanger and fastened thereto, a spring beam pivotably attached to the bushing, an integrally formed axle seat coupling the spring beam to an axle, and an air spring mounted between the axle seat and the vehicle frame.

20 Claims, 10 Drawing Sheets

SUSPENSION SYSTEM INCLUDING AN INTEGRALLY FORMED AXLE SEAT

BACKGROUND OF THE INVENTION

The present invention relates generally to suspension systems for trucks and trailers and, in a preferred embodiment thereof, more particularly provides a suspension system which includes an integrally formed axle seat.

Suspension systems for large trucks and trailers perform many functions related to the comfort, convenience, and safety of transporting such vehicles on a highway surface. Simply stated, a suspension system acts as an interface between a frame or body of a vehicle and a portion of the vehicle which engages a road surface. The suspension system typically supports or "suspends" the frame and/or body above the road-engaging portion, provides compliance which permits relative motion between them, absorbs shock, adjusts for varied loads and road conditions, structurally interconnects various components of the frame and road-engaging portion, etc.

Many types of suspension systems are well known in the art. One of these is known as a fabricated "trailing arm" suspension system. Generally, a trailing arm suspension system incorporates an approximately horizontally disposed arm that is aligned with a direction of travel of a vehicle. A forward end of the arm is usually pivotably attached to a hanger or bracket extending downwardly from the vehicle's frame.

An end of an axle is typically attached to the arm, such that the axle is perpendicular to the arm, and the axle is in most cases rearwardly disposed relative to the hanger. The other end of the axle is likewise attached to another arm. In this manner, the axle is secured to the vehicle and aligned perpendicular to the direction of travel of the vehicle.

A biasing member, such as a spring, is usually connected between the frame and the axle or arm. The spring, thus, biases the frame away from the axle. As a load is added to the vehicle, the spring may compress, or, conversely, as the load is removed from the vehicle, the spring may expand. Where the vehicle is equipped with conventional air springs and leveling valves, the leveling valves automatically adjust air pressure in the air springs so that the springs are maintained at substantially the same heights regardless of the load added to the vehicle. In that case, spring rates of the air springs are varied as the air pressure in the air springs are adjusted by the leveling valves, such that the spring rates increase with increased load added to the vehicle. While the vehicle is being transported across the road surface, the spring may be temporarily compressed as the road-engaging portion strikes an irregularity in the road surface, the spring later expanding when the irregularity has been traversed.

An example of a typical trailing arm suspension system may be found in U.S. Pat. No. 5,116,075 to Pierce, the disclosure of which is hereby incorporated by reference. In the trailing arm suspension system described therein, an air spring is utilized as the biasing member and a complex clamp is used to attach the axle to the arm. However, in addition to the exceedingly complicated axle clamping structure, the Pierce suspension system suffers from a disadvantage in that the axle clamping structure imparts substantial transverse loads to the axle. Most vehicle axles are highly stressed in the first instance and additional loads imparted by an axle clamp may either cause premature failure of the axle or require a stronger, and, thus, heavier, axle to compensate for the additional loads.

Furthermore, axle clamps, such as those utilized in the Pierce trailing arm suspension system, must be periodically checked for tightness. Loose axle clamps are known to cause premature suspension system failure. This periodic maintenance adds to the overall cost of the suspension system to its user.

One type of trailing arm suspension system is known as a "spring beam" suspension system. In a spring beam suspension system, the arm is a relatively flexible elongated member known as a "spring beam". Advantages of a spring beam suspension system include additional vertical compliance afforded by the spring beam and an ability of the spring beam to absorb torsional loads imparted thereto by the axle.

A typical spring beam suspension system is found in U.S. Pat. No. 4,506,910 to Bierens, the disclosure of which is hereby incorporated by reference. An axle is rigidly clamped to two transversely spaced apart spring beams. The axle is longitudinally intermediate hangers suspending forward ends of the spring beams from a vehicle frame, and air springs disposed between rear ends of the spring beams and the frame.

If one opposite end of the axle is vertically displaced relative to the other opposite end of the axle, such as when a wheel attached to one end of the axle traverses an irregularity on the road surface, the axle is effectively rotated about a longitudinal axis of the vehicle. Since the axle is rigidly clamped to the spring beam, such rotation is transferred from the axle to the spring beam, causing the spring beam to torsionally flex. Some of this torsional loading is absorbed by a pivot bushing attached to the forward end of the spring beam.

In trailing arm suspension systems having rigid arms, instead of spring beams as hereinabove described, such torsional flexing is typically absorbed by elastomeric bushings mounted at the pivotable attachments of the arms to the hangers. An example of such bushings may be found in U.S. Pat. No. 4,991,868 to VanDenberg, the disclosure of which is hereby incorporated by reference. The VanDenberg bushings have vertically spaced apart voids formed therein which enable the bushings to have greater compliance in response to the torsional flexing. Some trailing arm suspension systems are bushed both at the front pivot and at the attachment of the axle to the trailing arm, thereby absorbing the torsional flexing in multiple bushings.

Transverse links, which extend generally parallel to the axle and couple the axle directly to the vehicle frame via pivoting bushed connections at each end of the transverse links, are sometimes required to control transverse displacement of the axle relative to the vehicle frame. Such transverse displacement is commonly referred to as "track out" and may occur when, for example, the vehicle negotiates a corner. Transverse links are typically required where the spring beam is not sufficiently rigidly attached to the axle of the suspension system and, thus, add to the installation time, maintenance requirements, and overall cost of such suspension systems.

A disadvantage of each of the above-described suspension systems is that the axle is clamped to the arms or spring beams with complex, maintenance intensive, potentially stress-inducing, and/or unreliable clamping devices. Most of these suspension systems, and others, rely solely on U-clamps to clamp the axle to the arms. Unfortunately, U-clamps are notorious for their tendency to loosen over time. Other clamping devices, such as that described in the patent to Pierce, impart undesirable stresses to the axle.

From the foregoing, it can be seen that it would be quite desirable to provide a suspension system which does not include an axle clamping device that is complex, maintenance intensive, stress-inducing, or unreliable, but which includes an axle seat that effectively and rigidly attaches an axle to the suspension system, is simple and straightforward in design, is economical to manufacture, and that is reliable in operation. It is accordingly an object of the present invention to provide such a suspension system.

SUMMARY OF THE INVENTION

In carrying out the principles of the present invention, in accordance with an embodiment thereof, a suspension system is provided which includes an integrally formed axle seat, utilization of which does not impart additional stresses to the axle, but is capable of absorbing torsional flexing without the use of specially designed bushings, multiple bushings, etc.

In broad terms, a suspension system is provided for a vehicle having a frame and a road-engaging portion, the road-engaging portion having an axle transversely disposed relative to a direction of travel of the vehicle, the suspension system including a hanger mountable to the vehicle frame, a bushing received in the hanger and secured thereto, a spring beam pivotably attached to the hanger, an air spring mountable to the vehicle frame, and means for intersecuring the air spring and the spring beam, the intersecuring means being couplable to the axle.

A suspension system for suspending a vehicle frame relative to an axle is also provided. The suspension system includes a bracket, a bushing, a spring beam, and an axle seat assembly.

The bracket is mountable to the vehicle frame and the bushing is received in the bracket and fastened thereto. The spring beam is pivotably attached to the bracket via the bushing.

The axle seat includes a tubular or semi-tubular body having interior and exterior side surfaces, the body interior side surface being complementarily shaped to cooperatively receive the axle therein. A first plate is integrally formed with the body, the first plate being tangentially attached to the body exterior side surface. A second plate engages the first plate to thereby form an elongated aperture therebetween, the aperture being shaped to complementarily receive the spring beam therein.

In another aspect of the present invention, a device for coupling an axle to a spring beam in a suspension system of a vehicle, the axle extending generally transverse to a direction of travel of the vehicle and having a vertical midpoint on an external surface thereof, is provided. The device includes a body and first and second plates.

The body is generally tubular or semi-tubular and has interior and exterior side surfaces. The interior side surface is complementarily shaped to cooperatively receive the axle therein.

The first plate is generally planar and is integrally formed with the body. The first plate is tangentially attached to the body exterior side surface. A first series of spaced apart openings are formed through the first plate.

The second plate is generally planar and has a second series of spaced apart openings formed therethrough. The second series of openings are axially aligned with the first series of openings. The second plate engages the first plate to thereby form an elongated aperture therebetween, which aperture is shaped to complementarily receive the spring beam therein. A plurality of fasteners extend into the first and second openings to thereby fasten the first plate to the second plate.

DETAILED DESCRIPTION

Figure 1:
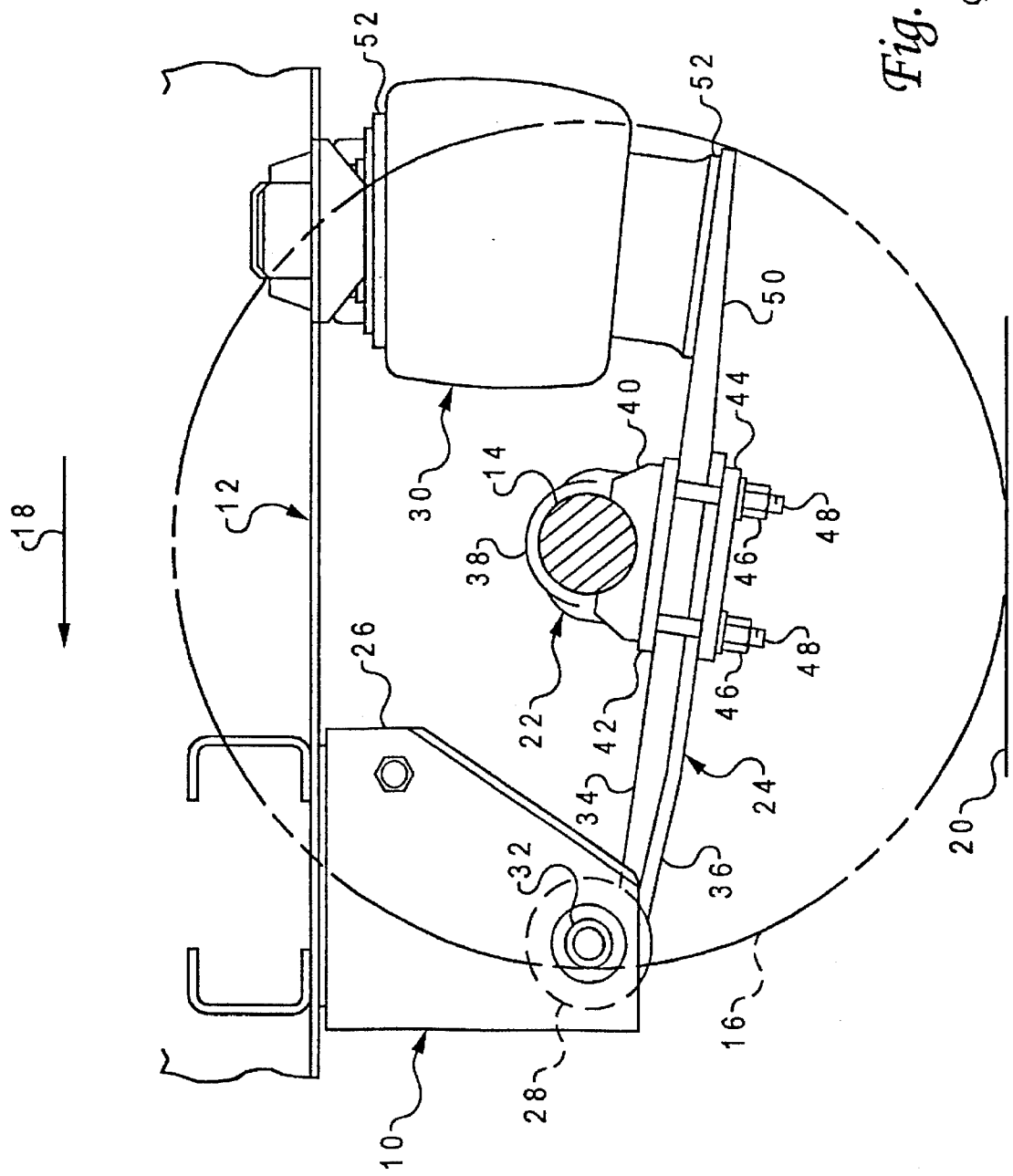
FIG. 1 (Prior Art) is a side elevational view of a spring beam suspension system.

Illustrated in FIG. 1 (Prior Art) is a spring beam suspension system 10. The suspension system 10 shown in FIG. 1 is similar to that disclosed in U.S. Pat. No. 4,506,910 to Bierens. The suspension system 10 interconnects a vehicle frame 12 to an axle 14, which, in turn, is rotatably connected to a road-engaging wheel 16.

The frame 12 is elongated in a direction generally perpendicular to an axis of the axle 14. Thus, the axle 14 is transversely oriented relative to the frame 12. Axle 14 is also generally parallel to a road surface 20 which is contacted by the wheel 16.

A forward direction of travel of the vehicle frame 12 is indicated by arrow 18. As the vehicle frame 12 is displaced in the forward direction 18, wheel 16 rotates about the axle 14.

The suspension system 10 includes an axle clamp 22, a spring beam 24, a hanger 26, a bushing 28, and an air spring 30. It is to be understood that suspension system 10 includes an essentially identical set of axle clamp 22, spring beam 24, hanger 26, bushing 28, air spring 30, and wheel 16 at an opposite end of the axle 14, transversely spaced apart from the set shown in FIG. 1.

The hanger 26 is welded, bolted, or otherwise rigidly secured to the frame 12 and extends downwardly therefrom. The bushing 28 pivotally attaches the spring beam 24 to the hanger 26 and is fastened thereto by a suitable fastener 32. Thus, spring beam 24 may pivot about the bushing 28 which is held in place on the hanger 26 by fastener 32.

The spring beam 24 includes an elongated and longitudinally disposed spring member 34, which extends from the bushing 28 to the air spring 30, and a relatively shorter stiffening member 36, which extends from the bushing 28 to the axle clamp 22. In this manner, the spring beam 24 is made relatively stiffer between the bushing 28 and the axle clamp 22 than it is between the axle clamp 22 and the air spring 30.

The axle clamp 22 is disposed longitudinally intermediate the bushing 28 and the air spring 30. The axle clamp 22 includes two U-bolts 38 (only one of which is visible in FIG. 1), a saddle 40, an upper plate 42, a lower plate 44, and four nuts 46 (only two of which are visible in FIG. 1). The U-bolts 38 serve to partially encircle the axle 14 and apply a vertical clamping force to the axle when nuts 46 are tightened onto the downwardly projecting threaded ends 48 of the U-bolts.

Note that when nuts 46 are tightened onto the threaded ends 48 of the U-bolts 38, many layers of parts are compressed generally vertically between the U-bolts and the nuts: the axle 14, the saddle 40, the upper plate 42, the spring member 34, the stiffening member 36, and the lower plate 44. For this reason, it is quite common for the nuts 46 to loosen, for the various parts to shift relative to one another during use, and for the axle clamp 22 to, in general, be a high maintenance assembly. Even if the nuts 46 are tightened sufficiently onto the U-bolts 38 to absolutely prohibit any relative motion between the parts clamped therebetween, eventually the parts will wear, become fatigued, and/or succumb to creep, etc., and the nuts 46 will loosen.

The U-bolts 38 and saddle 40 together virtually completely encircle the axle 14, but as stated hereinabove, the clamping force is generally vertically oriented. Thus, the U-bolts 38 and the saddle 40 essentially clamp on upper and lower surfaces of the axle 14. It will be readily apparent to one of ordinary skill in the art that the upper and lower surfaces of the axle 14 are the portions of the axle subjected to maximum bending stress due to the vehicle's weight being supported by the wheels 16. It will also be readily apparent to one of ordinary skill in the art that such impingement of the U-bolts 38 and the saddle 40 upon the upper and lower surfaces of the axle 14 reduces the effective bending strength of the axle.

When the wheel 16 on one end of the axle 14 is forced to displace vertically upward or downward by, for example, encountering an obstacle on the road surface 20, and the wheel 16 on the other side of the axle is not similarly vertically displaced, the axle is thereby forced to rotate about a longitudinal axis, i.e., an axis oriented generally in the direction indicated by arrow 18, which is generally perpendicular to the axle. This rotation of the axle 14 causes torsional flexing of the spring beam 24, and must be transmitted from the axle to the spring beam through the many individual parts of the axle clamp 22. It will be readily apparent to one of ordinary skill in the art that such torsional loading of the axle clamp 22 will further contribute to the loosening of the nuts 46 and add to the maintenance required by the suspension system 10.

The air spring 30 is vertically disposed between a rearwardly extending end 50 of the spring beam 24 and the vehicle frame 12. In general, the air spring 30 permits the frame 12 to be raised or lowered relative to the axle 14, adjusts for heavier or lighter loads placed on the frame, affects the compliance of the suspension system 10, etc. A leveling valve (not shown) may adjust air pressure in the air spring 30 to compensate for varied loads carried on the vehicle frame 12.

Plates 52 at either end of the air spring 30 facilitate mounting the air spring to flat surfaces on the spring beam end 50 and frame 12. If one of the plates 52 were mounted to the axle clamp 22, end 50 of the spring beam 24 could be eliminated, resulting in a more longitudinally compact suspension system. Such a compact suspension system would also have reduced weight.

Figure 2:
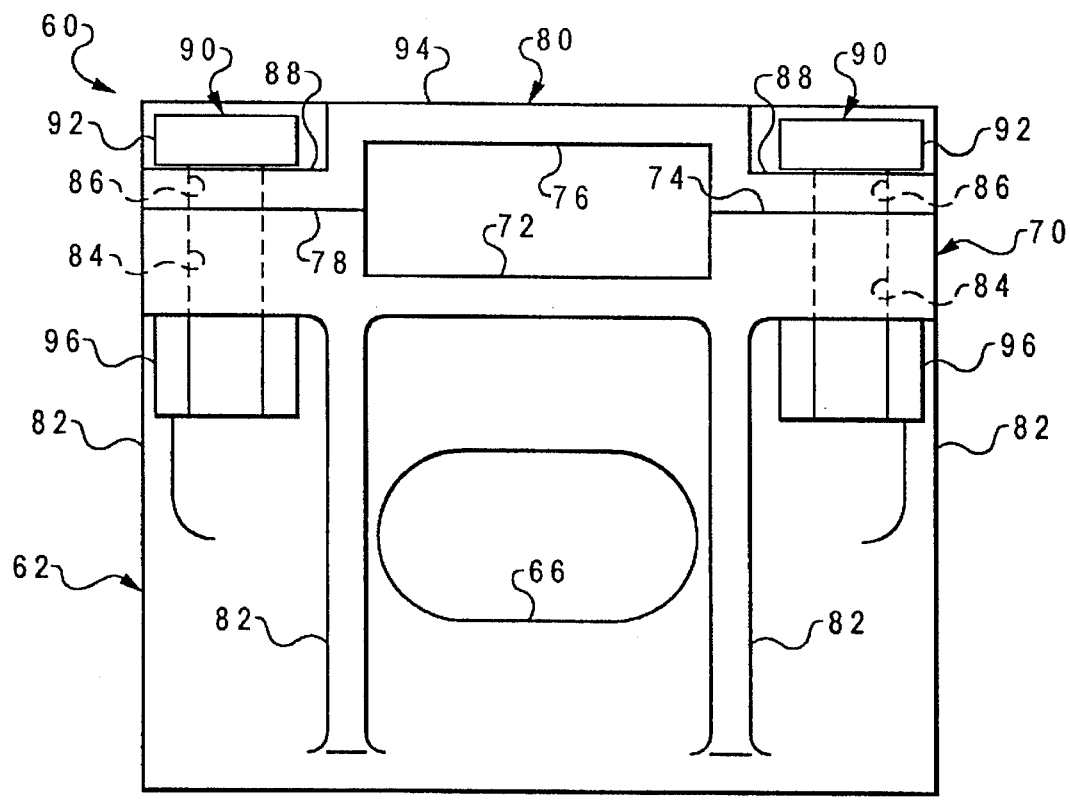
FIG. 2 is a rear elevational view of an integrally formed axle seat embodying principles of the present invention.
Figure 3:
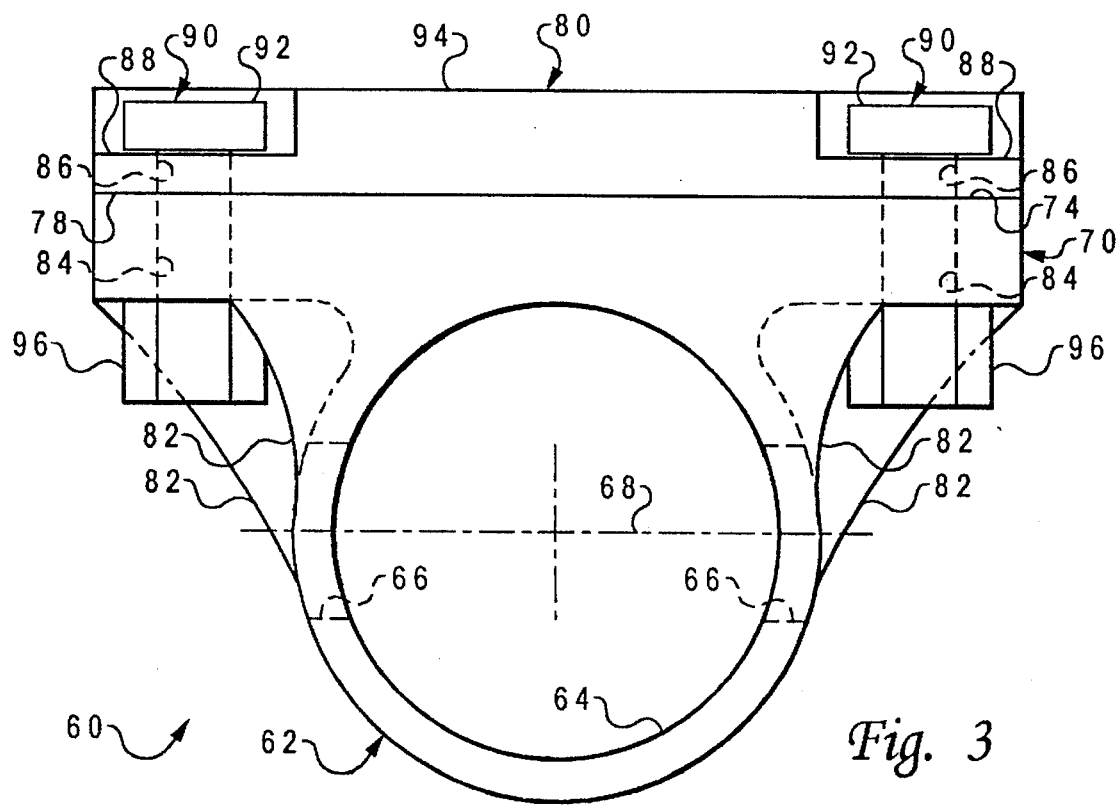
FIG. 3 is a side elevational view of the axle seat of FIG. 2.

Turning now to FIGS. 2 & 3, rear and side elevational views, respectively, of an integrally formed axle seat 60 embodying principles of the present invention are representatively illustrated. In the following detailed description of the embodiment of the present invention representatively illustrated in the accompanying figures, directional terms, such as "upper", "lower", "upward", "downward", "horizontal", "vertical", etc., are used in relation to the illustrated axle seat 60 as it is depicted in the accompanying figures. It is to be understood that the axle seat 60 may be utilized in vertical, horizontal, inverted, or inclined orientations without deviating from the principles of the present invention.

The axle seat 60 includes a generally cylindrical tubular body 62. The body 62 has an opening 64 formed therethrough for receipt of an axle (not shown) therein. Although the representatively illustrated opening 64 is generally circular in cross-section, it is to be understood that other shapes may be utilized for the opening, for example, if the axle has a generally square cross-section, opening 64 may have a complementarily-shaped square cross-section as well.

Applicant prefers that the body 62 be made of a strong and malleable material, such as steel, and that opening 64 be dimensioned so that the axle seat 60 may be press fit onto a suitable axle. This eliminates the need for fasteners, clamps, plates, etc., in installing the axle seat 60 on the axle. It is to be understood, however, that other materials may be utilized in making the axle seat 60, such as ductile cast iron, aluminum, and composite materials, and other methods may be utilized for installing the body 62 on the axle, such as shrink fitting or slip fitting, without departing from the principles of the present invention.

As representatively illustrated, body 62 includes two weld openings 66 formed therethrough. The weld openings 66 are disposed on the body 62 such that, when an axle (not shown) is installed in the opening 64, the weld openings 66 will straddle the axle. Thus, if the axle seat 60 is installed into a suspension system (not shown) and is oriented as shown in FIGS. 2 & 3, weld openings 66 are aligned along a generally horizontal axis 68.

Applicant prefers that, after the axle clamp 60 has been press fitted onto an axle, the body 62 is welded to the axle at weld openings 66. Note that, with the axle clamp 60 configured as representatively illustrated in FIGS. 2 & 3, such welding is accomplished at a vertical midpoint of the axle. As will be readily appreciated by one of ordinary skill in the art, the vertical midpoint of the axle is the region subjected to minimum bending stress. It is to be understood that it is not necessary for axle clamp 60 to be welded to the axle in keeping with the principles of the present invention.

The axle seat 60 further includes a generally planar and generally horizontally disposed base plate 70. The base plate 70 is integrally formed with the body 62 and is upwardly disposed relative to the body as representatively illustrated in FIGS. 2 & 3. A channel 72 is formed on an upper surface 74 of the base plate 70 and extends in a direction generally parallel to the axis 68 and generally orthogonal to the opening 64.

The channel 72 is shaped to complementarily receive a lower portion of a spring beam (not shown) therein. As representatively illustrated, the channel 72 is generally rectangular in shape, but it is to be understood that the channel may be otherwise shaped without departing from the principles of the present invention. For example, in the description hereinbelow accompanying the embodiment of the present invention representatively illustrated in FIG. 8, an alternate channel shape is described wherein deformable members and a spring beam having outer projections formed thereon may be incorporated.

Applicant prefers that channel 72, in cooperation with an aligned and oppositely facing channel 76 formed on a lower surface 78 of a closure plate 80, closely and complementarily conform to the spring beam (not shown) received therein. It is to be understood that the spring beam may be a press fit, slip fit, shrink fit, or otherwise fit in the channels 72, 76 without departing from the principles of the present invention. It is to be further understood that it is not necessary for a cooperating channel 76 to be formed on the closure plate 80 since, for example, channel 72 may be formed on the upper surface 74 to completely receive the spring beam therein, and lower surface 78 may merely cover the spring beam after it is received in the channel 72.

The base plate 70 is laterally outwardly supported relative to the body 62 by a series of transversely spaced apart ribs 82 integrally formed between the base plate and the body. The ribs 82 are generally triangular in shape as representatively illustrated and function to strengthen the interconnection of the base plate 70 to the body 62 for transmission of forces therebetween. Four each of the ribs 82 are shown formed on opposite sides of the body 62 and base plate 70, although it is to be understood that other quantities and placements of the ribs may be utilized without departing from the principles of the present invention.

Note that inner ones of the ribs 82 extend further downward on the body 62 than outer ones of the ribs and transversely straddle the weld openings 66. Note, also, that the inner ones of the ribs 82 are shown as being downwardly extended in FIG. 2 as compared to the inner ones of the ribs shown in FIG. 3, to illustrate a potential alternate configuration of the ribs.

The upper plate 70 includes a series of four longitudinally and transversely spaced apart openings 84 formed vertically therethrough (only three of which are shown in FIGS. 2 & 3). Each of the openings 84 vertically align with one of four openings 86 formed vertically through the closure plate 80. Additionally, the closure plate 80 has four depressions 88 formed thereon vertically upwardly adjacent the openings 86.

A fastener 90 is received in each of the aligned pairs of openings 84, 86, a head portion 92 of each fastener being received in one of the depressions 88. In this manner, the head portions 92 do not project upwardly above an upper surface 94 of the closure plate 80. Although it is not necessary for the head portions 92 to be below the upper surface 94, this configuration is advantageous when the upper surface is utilized for attachment of an air spring (not shown) thereto, as described more fully hereinbelow.

Applicant prefers that the fasteners 90 be of the type known to those skilled in the art as "hucks", wherein an end portion 96 is permanently secured to a shank portion 98 as tension is applied to the shank portion by an installation tool (not shown). In this manner, the closure plate 80 is rigidly mounted to the body 62 and vibration, shock loads, torsional loads, wear, etc. will not loosen the hucks 90. Thus, the closure plate 80 is secured to the body 62 without any intermediate plates, saddles, etc. to loosen, wear, become misaligned, and otherwise necessitate maintenance on the axle seat 60. It is to be understood, however, that other fasteners, such as rivets, bolts, screws, etc., and other means of securing the closure plate 80 to the body 62, such as integrally forming, welding, etc., may be utilized for the fasteners 90 without departing from the principles of the present invention.

Figure 4:
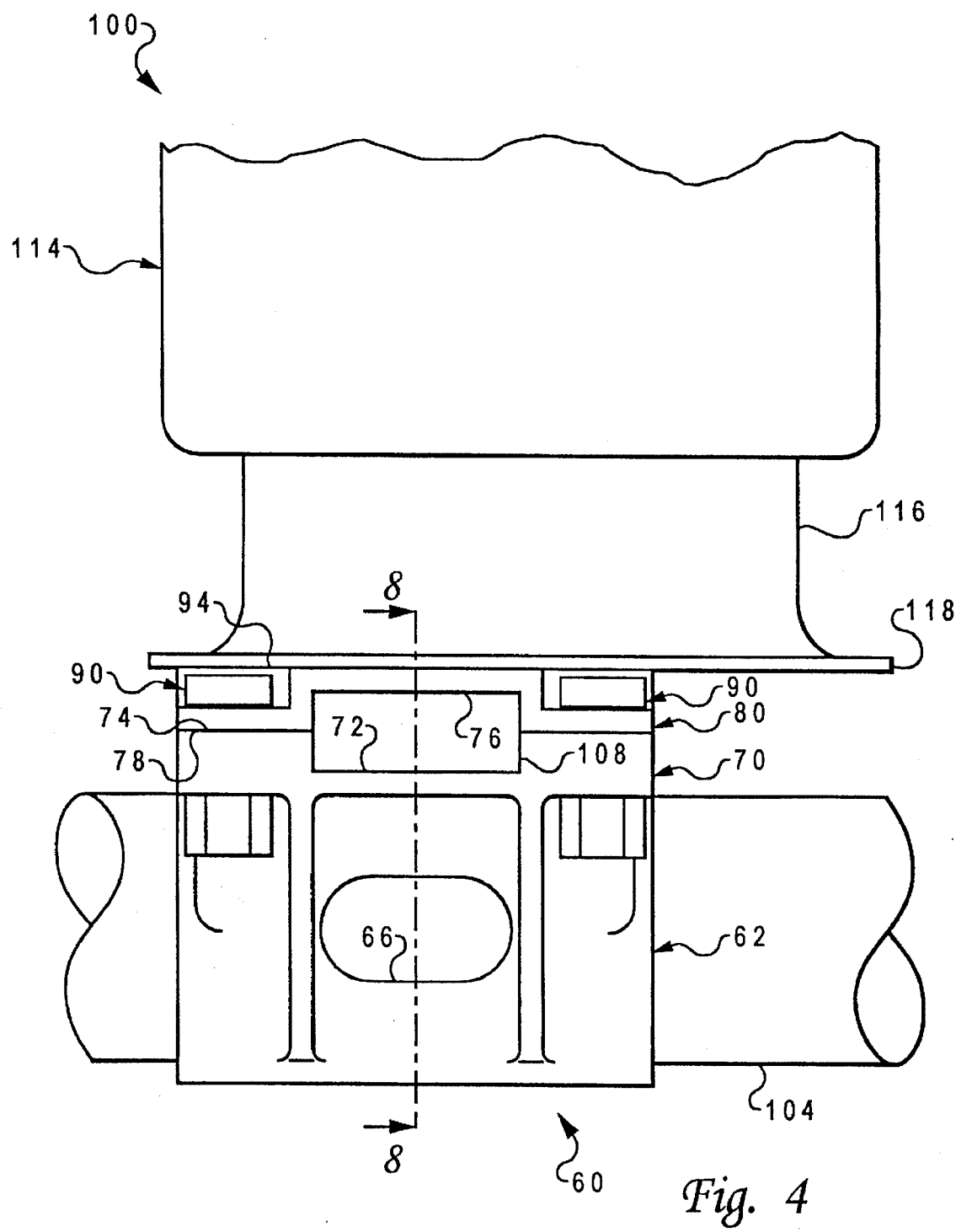
FIG. 4 is a rear elevational view of the axle seat of FIG. 2 incorporated in a first spring beam suspension system embodying principles of the present invention.
Figure 5:
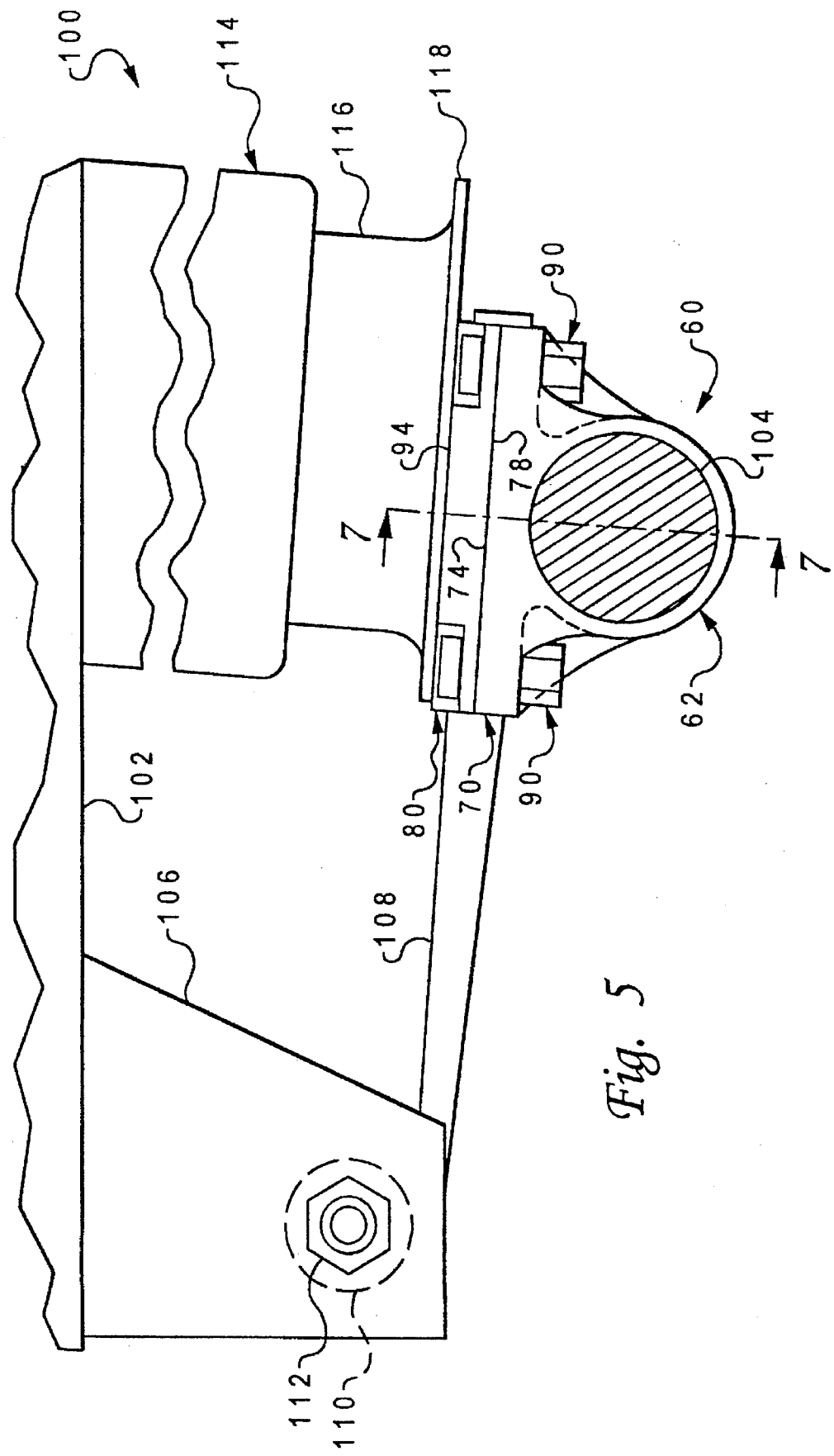
FIG. 5 is a side elevational view of the first spring beam suspension system of FIG. 4.

Illustrated in FIGS. 4 & 5 are rear and side elevational views, respectively, of a spring beam suspension system 100 embodying principles of the present invention, the spring beam suspension system incorporating the axle seat 60 of FIGS. 2 & 3 therein. A longitudinally extending and generally horizontal vehicle frame 102 is shown being suspended by the suspension system 100 vertically above a transversely extending and generally horizontal cylindrical axle 104 (see FIG. 5). The vehicle frame 102 may be a portion of a trailer, a truck, or other conveyance (not shown) and may be otherwise oriented, and the axle 104 may be otherwise shaped and oriented without departing from the principles of the present invention.

In a typical utilization of the present invention, two suspension systems 100 suspend the vehicle frame 102 above the axle 104. The suspension systems 100 are, in that case, transversely spaced apart. For ease of describing the suspension system 100, however, the following description will detail the installation of a single suspension system, but it is to be understood that any quantity of suspension systems may be utilized without departing from the principles of the present invention.

The axle seat 60 is installed on the axle 104 by pressing, shrinking, slipping, or otherwise fitting the axle seat to the axle. Thereafter, the axle seat 60 may, if desired, be welded to the axle 104 at openings 66. The axle seat 60, thus, completely encircles the axle 104 and is rigidly secured thereto, without the necessity of saddles, U-bolts, plates, etc.

A hanger 106 extends downwardly from the vehicle frame 102. The hanger 106 functions as a bracket for supporting the suspension system 100 beneath the frame 102.

A spring beam 108 is pivotably connected to the hanger 106 by means of a transversely extending bushing 110. The bushing 110 is conventional and may be elastomeric, a combination of steel and elastomeric materials, a fiber composite material, etc. The spring beam 108 is preferably made of steel, although other materials, such as aluminum, fiber composites, combinations of these materials, etc. may be utilized without departing from the principles of the present invention.

The spring beam 108 and bushing 110 are fastened to the hanger 106 by a transversely extending fastener 112. The fastener 112 may be a rivet, a nut and bolt, etc. According to conventional practice, the spring beam 108 may be wrapped around the bushing 110, although other methods may be utilized without departing from the principles of the present invention.

The spring beam 108 has a generally rectangular cross-section. The channels 72, 76 are complementarily shaped relative to the spring beam 108 and receive the spring beam cooperatively therein. Properly dimensioned and toleranced, the channels 72, 76 will grippingly engage the spring beam 108 when the fasteners 90 clamp the closure plate 80 to the base plate 70 as more fully described hereinabove.

Applicant prefers that channels 72 and 76 grippingly and clampingly engage the spring beam 108 as upper surface 74 of the base plate 70 contacts lower surface 78 of the closure plate 80. However, spring beam 108 may be otherwise clamped to the axle seat 60 without departing from the principles of the present invention. For example, the closure plate 80 may not contact the base plate 70 when fasteners 90 are installed. As further examples, see the detailed descriptions hereinbelow accompanying FIGS. 7 & 8.

A conventional air spring 114 is attached to the frame 102 in a conventional manner (not shown). A lower end 116 of the air spring 114 is fastened to the axle seat 60 by means of an adapter plate 118. The adapter plate 118 functions as an interface between the air spring 114 and the upper surface 94 of the closure plate 80. It is to be understood that the lower end 116 of the air spring 114 may be connected directly to the closure plate 80, may be integrally formed therewith, and may be otherwise configured without departing from the principles of the present invention. Where the adapter plate 118 is utilized, however, it may be welded to either or both of the lower end 116 and closure plate 80, fastened thereto with conventional threaded fasteners, riveted thereto, and/or otherwise fastened without departing from the principles of the present invention. As shown in FIGS. 4 & 5, the air spring 114 is longitudinally and transversely offset with respect to the closure plate 80, but the air spring 114 may also be centered longitudinally and transversely on the closure plate 80 if desired.

Thus has been described the novel suspension system 100 which is compact, low in weight, has a reduced number of parts as compared to typical spring beam suspension systems, and which utilizes the unique axle seat 60 therein. Furthermore, the axle seat 60 decreases the need for periodic maintenance of the suspension system 100 as compared to typical spring beam suspension systems, and provides convenient mounting of the air spring 114 thereto. These and other benefits of the suspension system 100 will be readily apparent to a skilled artisan upon consideration of FIGS. 4 & 5, and the accompanying detailed description hereinabove. Additionally, alternate embodiments of the present invention are described hereinbelow, in the detailed descriptions accompanying FIGS. 6–10.

Figure 6:
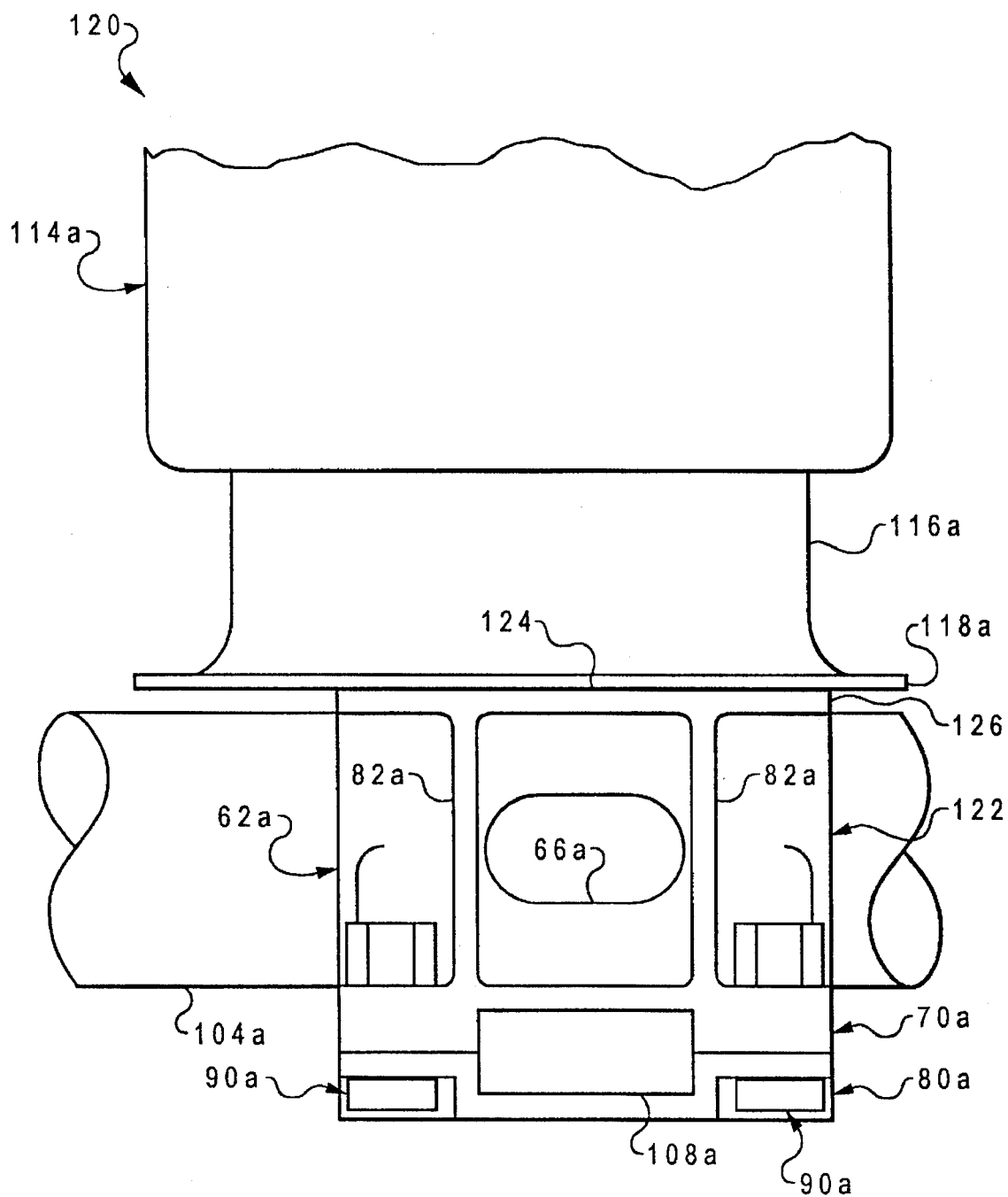
FIG. 6 is a rear elevational view of a second spring beam suspension system embodying principles of the present invention.

Referring additionally now to FIG. 6, a rear elevational view of an alternate suspension system 120 embodying principles of the present invention is representatively illustrated. In the following detailed description of the suspension system 120, elements thereof which are similar to previously described elements are indicated with the same reference numerals, with an added suffix "a".

In basic terms, the suspension system 120 shown in FIG. 6 alters the relationship of the axle 104a to the spring beam 108a, such that the axle is positioned above the spring beam. Where it is not desired to mount the air spring 114 to the axle seat 60 as shown in FIG. 4, the axle 104a may be positioned above the spring beam 108a by merely rotating the axle seat 180 degrees about the axle. Where, however, the air spring 114a is to be mounted to the axle seat 60, provision must be made therefor.

The suspension system 120 shown in FIG. 6 includes a specially designed axle seat 122 which positions the axle 104a above the spring beam 108a, and which provides a generally planar and generally horizontally disposed upper surface 124. The adapter plate 118a may be utilized to mount the lower end 116a of the air spring 114a to the upper surface 124, or the lower end may be mounted directly to the upper surface 124 as previously described for the adapter plate 118 and upper surface 94 shown in FIGS. 4 & 5. Similarly, the air spring 114a may be centered on the upper surface 124, or it may be transversely and/or longitudinally offset as desired.

In the axle seat 122, two of ribs 82a extend from the base plate 70a to a generally planar upper plate 126. Thus, the upper plate 126, the body 62a, and the base plate 70a are integrally and structurally interconnected by the ribs 82a. It is to be understood that any number of ribs 82a may be utilized for such structural interconnection, or none of the ribs may be so utilized, without departing from the principles of the present invention.

With the exception of the foregoing described alterations, the suspension system 120 shown in FIG. 6 is similar to the suspension system 100 shown in FIGS. 4 & 5. The spring beam 108a is pivotably connected via a bushing similar to bushing 110 to a hanger similar to hanger 106 attached to a vehicle frame similar to frame 102. The air spring 114a is similarly attached to the vehicle frame.

Thus has been described the novel suspension system 120 which is compact, low in weight, has a reduced number of parts as compared to typical spring beam suspension systems, which permits the axle 104a to be disposed above the spring beam 108a, and which utilizes the unique axle seat 122 therein. These and other benefits of the suspension system 120 will be readily apparent to a person of ordinary skill in the art upon consideration of FIG. 6 and the accompanying detailed description hereinabove.

Figure 7:
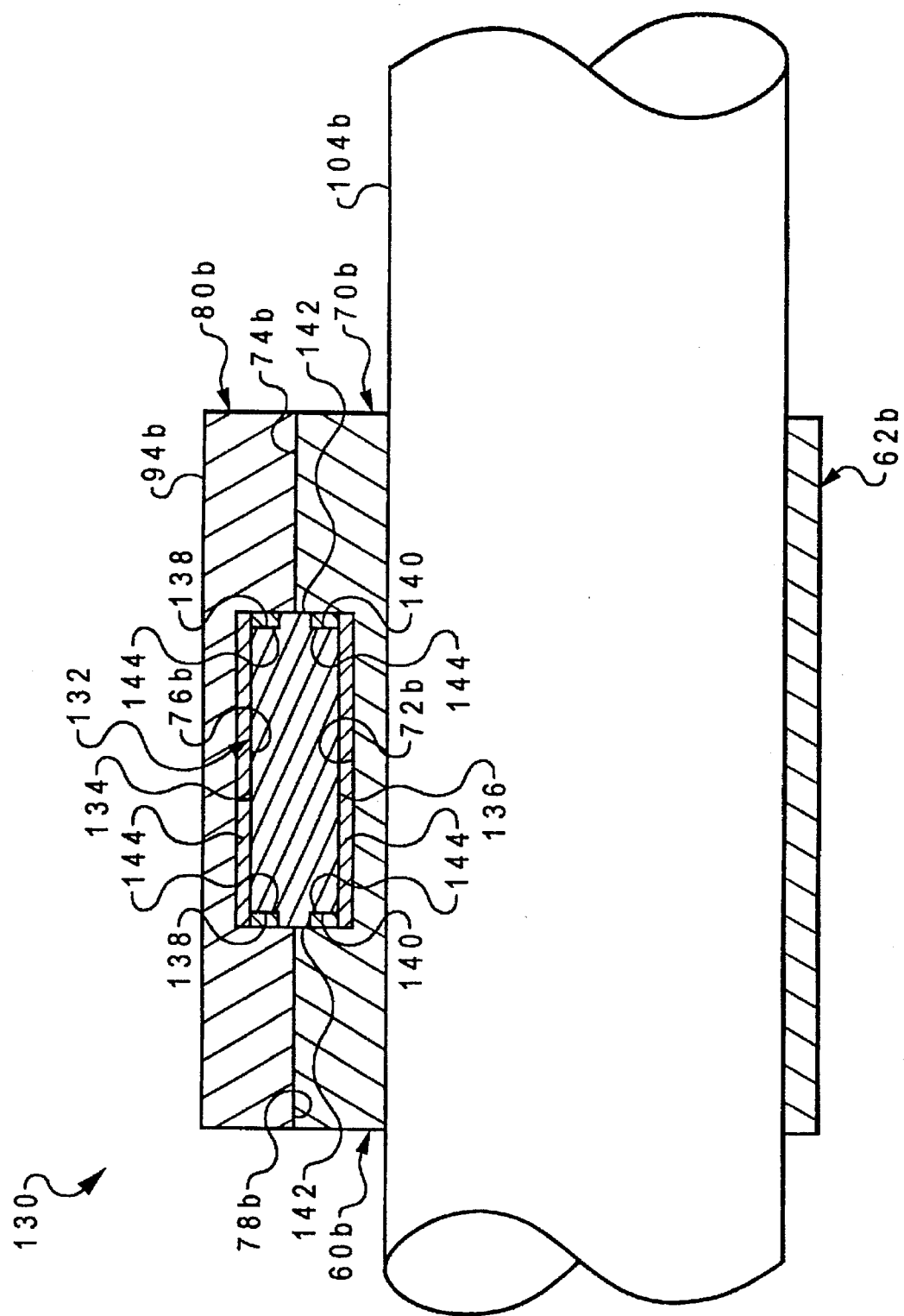
FIG. 7 is a cross-sectional view of the first spring beam suspension system, taken along line 7—7 of FIG. 5, showing a first alternate configuration thereof.

Referring additionally now to FIG. 7, a cross-sectional view of an alternate suspension system 130 embodying principles of the present invention is representatively illustrated, taken along line 7—7 of FIG. 5. FIG. 7 shows an alternate construction of the axle seat 60, and the air spring 114 is not shown for illustrative clarity. In the following detailed description of the suspension system 130, elements thereof which are similar to previously described elements are indicated with the same reference numerals, with an added suffix "b".

The suspension system 130 utilizes an axle seat 60b which is similar to axle seat 60 shown in FIG. 4. However, an alternate spring beam 132 is secured in the channels 72b, 76b of the base plate 70b and closure plate 80b, respectively. The spring beam 132 includes upper and lower transversely extending recessed portions 134, 136, respectively, and upper and lower vertically extending recessed portions 138, 140, respectively. Note that portions 142 of the spring beam 132 remain in contact with the channels 76b and 72b.

A deformable pad 144 is compressed between each of the recessed portions 134, 136, 138, 140 and each of the channels 72b, 76b when the closure plate 80b is fastened to the base plate 70b. Applicant prefers the pads 144 be made of a deformable plastic material, such as nylon, but the pads may also be made of a deformable metal, such as aluminum, an elastomeric material, such as vulcanized rubber, or any other deformable material. Applicant also prefers that the pads 144 be made of a resilient material, but the pads may be otherwise manufactured without departing from the principles of the present invention. For example, pads 144 may be made of a semi-solid or fluid material, such as an adhesive, which hardens after being deformed between the closure plate 80b and the base plate 70b.

When the closure plate 80b is fastened to the base plate 70b, such as with fasteners 90 shown in FIG. 5, the spring beam 132 and some or all of the pads 144 are compressed between the channels 72b, 76b. The pads 144 enhance gripping engagement between the axle seat 60b and the spring beam 132, and permit manufacturing tolerances to be loosened in this area of the suspension system 130, while at the same time permitting contact between surfaces 74b and 78b when the closure plate 80b is fastened to the base plate 70b. It is to be understood that the pads 144 and recessed portions 134, 136, 138, 140 may be otherwise disposed, and the contacting portions 142 may be otherwise disposed, such as horizontally instead of vertically, without departing from the principles of the present invention.

The suspension system 130 is, except for the foregoing described alternative configuration, similar to the suspension system 100 shown in FIGS. 4 & 5. Therefore, an air spring similar to air spring 114 is mounted intermediate the closure plate 80b and a vehicle frame similar to frame 102, and the spring beam 132 is pivotably mounted to a hanger similar to hanger 106 which is mounted to the frame. Note that the alternate configuration shown in FIG. 7 may be utilized with minor modification in the suspension system 120 shown in FIG. 6 as well.

Figure 8:
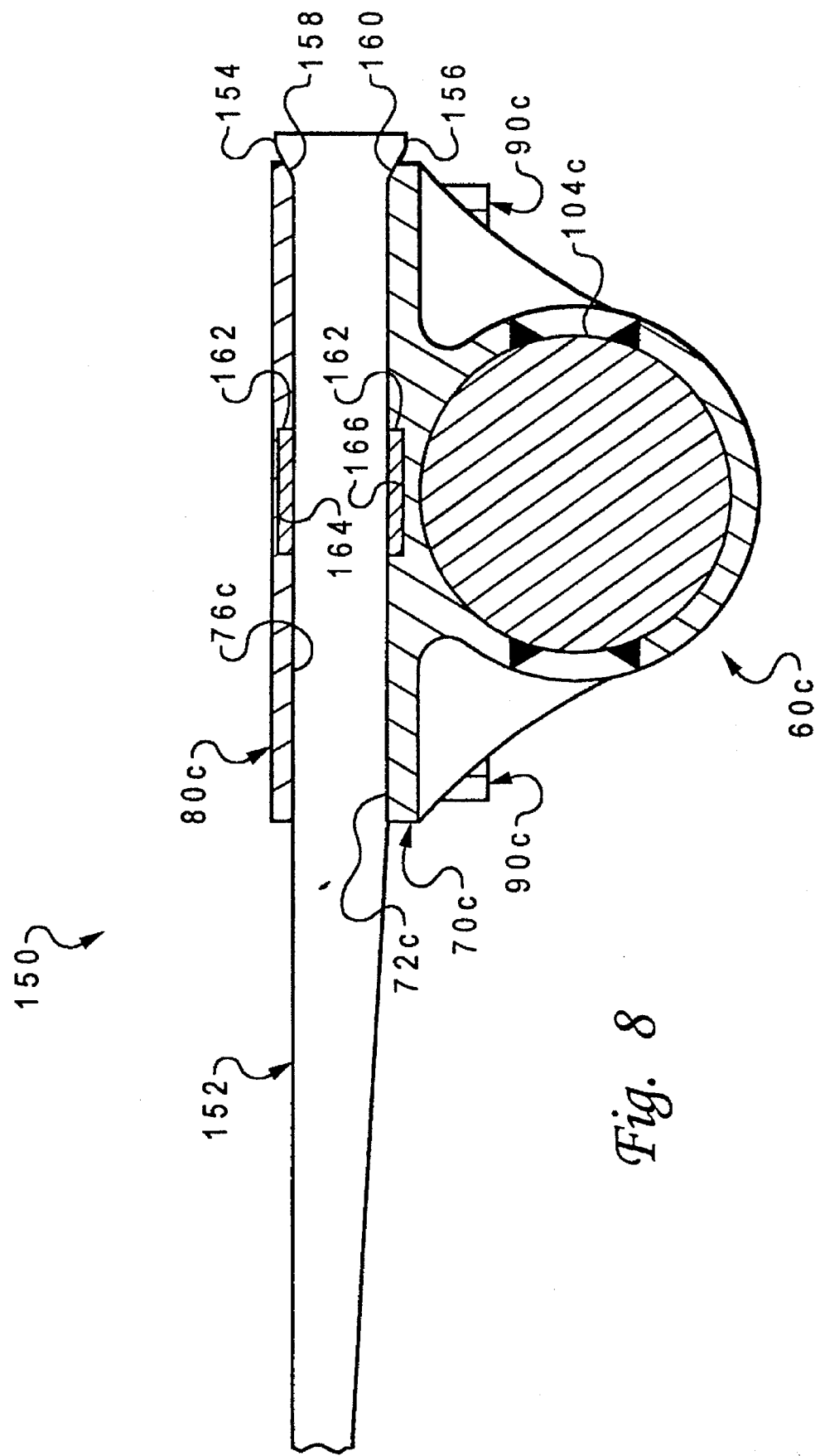
FIG. 8 is a cross-sectional view of the first spring beam suspension system, taken along line 8—8 of FIG. 4, showing a second alternate configuration thereof.

Referring additionally now to FIG. 8, a cross-sectional view of an alternate suspension system 150 embodying principles of the present invention is representatively illustrated, taken along line 8—8 of FIG. 4. FIG. 8 shows an alternate construction of the axle seat 60, and the air spring 114 is not shown for illustrative clarity. In the following detailed description of the suspension system 150, elements thereof which are similar to previously described elements are indicated with the same reference numerals, with an added suffix "c".

The suspension system 150 utilizes an axle seat 60c which is similar to axle seat 60 shown in FIG. 4. However, an alternate spring beam 152 is secured in the channels 72c, 76c of the base plate 70c and closure plate 80c, respectively. The spring beam 152 includes upper and lower enlarged portions 154, 156, respectively, and the closure plate 80c and base plate 70c have complementarily shaped recesses 158, 160 formed thereon, respectively, which cooperatively engage the enlarged portions.

As will be readily appreciated by one of ordinary skill in the art, the cooperative engagement of the enlarged portions 154, 156 with the recesses 158, 160 aids in preventing forward displacement of the spring beam 152 relative to the axle seat 60c. It will also be readily appreciated by a skilled artisan that enlarged portions and recesses similar to enlarged portions 154, 156 and recesses 158, 160 may be otherwise disposed on the spring beam 152 and axle seat 60c for prevention of displacement therebetween. For example, closure plate 80c may have an inwardly projecting enlarged portion (not shown) which cooperatively engages a recess (not shown) formed on the spring beam 152, and which prevents both longitudinally forward, backward, and transverse displacement of the axle seat 60c relative to the spring beam. These and other modifications may be made to the suspension system 150 without departing from the principles of the present invention.

The suspension system 150 also includes two deformable pads 162, each of which is compressed between one of two recessed portions 164, 166 formed on each of the channels 76c, 72c, respectively when the closure plate 80c is fastened to the base plate 70c. The pads 162 may be made of material similar to that described above for pads 144, or may be made of different material. As with the pads 144, pads 162 enhance gripping engagement between the axle seat 60c and the spring beam 152, and permit manufacturing tolerances to be loosened in this area of the suspension system 150. It is to be understood that the pads 162 and recessed portions 164, 166 may be otherwise disposed without departing from the principles of the present invention.

The suspension system 150 is, except for the foregoing described alternative configuration, similar to the suspension system 100 shown in FIGS. 4 & 5. Therefore, an air spring similar to air spring 114 is mounted intermediate the closure plate 80c and a vehicle frame similar to frame 102, and the spring beam 152 is pivotably mounted to a hanger similar to hanger 106 which is mounted to the frame. Note that the alternate configuration shown in FIG. 8 may be utilized with minor modification in the suspension system 120 shown in FIG. 6 as well.

Figure 9:
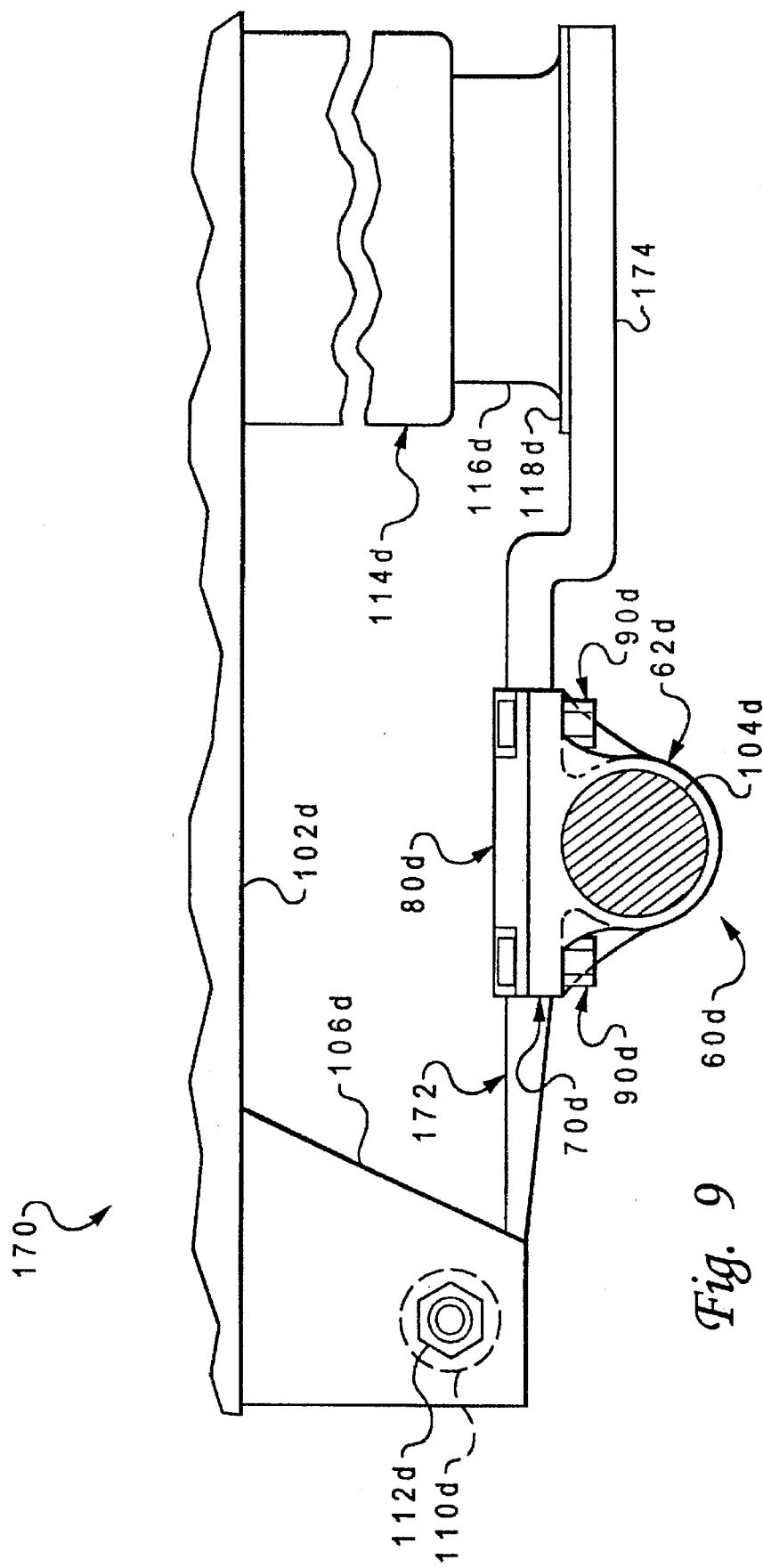
FIG. 9 is a side elevational view of a third spring beam suspension system embodying principles of the present invention.

Referring additionally now to FIG. 9, a side elevational view is representatively illustrated of a suspension system 170 embodying principles of the present invention. The suspension system 170 utilizes a spring beam 172 which is similar to the spring beam 108 shown in FIG. 5, but which has an outwardly extended and downwardly disposed end portion 174 formed thereon. In the following detailed description of the suspension system 170, elements thereof which are similar to previously described elements are indicated with the same reference numerals, with an added suffix "d".

The suspension system 170 may be utilized in situations in which longitudinal compactness is not a high priority and/or in which vertical compactness is a high priority in a vehicle design. Note that the downward disposition of the end portion 174 enables the air spring 114d to be attached thereto (via adapter plate 118d) at a level vertically below the closure plate 80d. It is to be understood that modifications may be made to the suspension system without departing from the principles of the present invention, for example, the end portion 174 may be vertically upwardly disposed relative to the remainder of the spring beam 172 to raise the frame 102d relative to the axle 104d.

Figure 10:
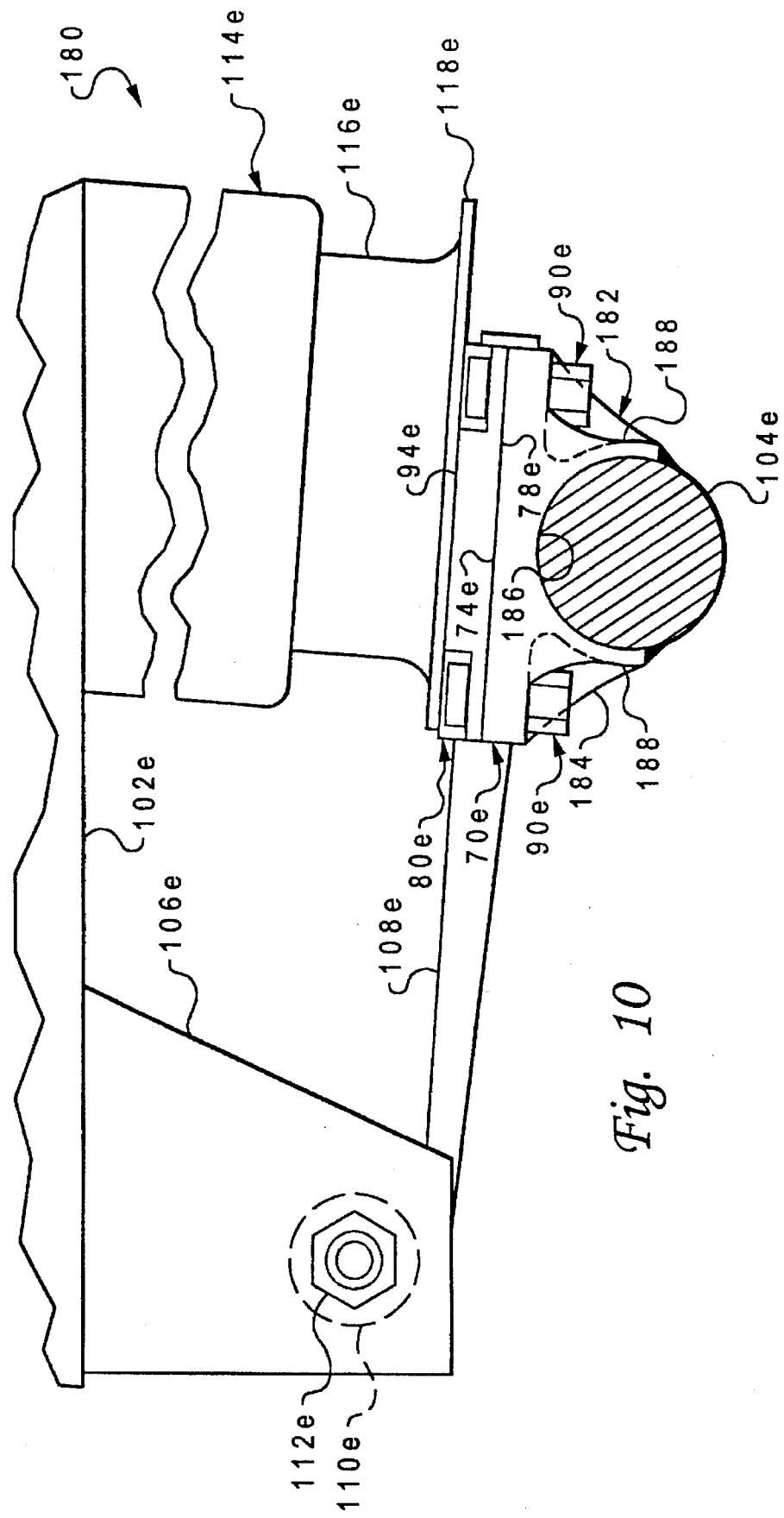
FIG. 10 is a side elevational view of the first spring beam suspension system, showing a third alternate configuration thereof.

Referring additionally now to FIG. 10, a side elevational view is representatively illustrated of a suspension system 180 embodying principles of the present invention. The suspension system 180 utilizes an axle seat 182 which is similar to the axle seat 60 shown in FIGS. 2&3, but which has a body 184 that does not completely surround the axle 104e. In the following detailed description of the suspension system 180, elements thereof which are similar to previously described elements are indicated with the same reference numerals, with an added suffix "e".

The representatively illustrated body 184 of the axle seat 182 is semi-tubular in that it does not completely encircle the axle 104e. As shown in FIG. 10, an inner surface 186 of the body 184 comprises an approximately 180 degree arc about the axle 104e. It is to be understood that the inner surface 186 may be otherwise formed to complementarily engage differently shaped axles.

The body 184 is welded to the axle 104e at transversely extending end portions 188. Thus, the welding operation is performed near the horizontal axis of the axle 104e where minimal bending stresses would typically occur in operation.

Figure 11:
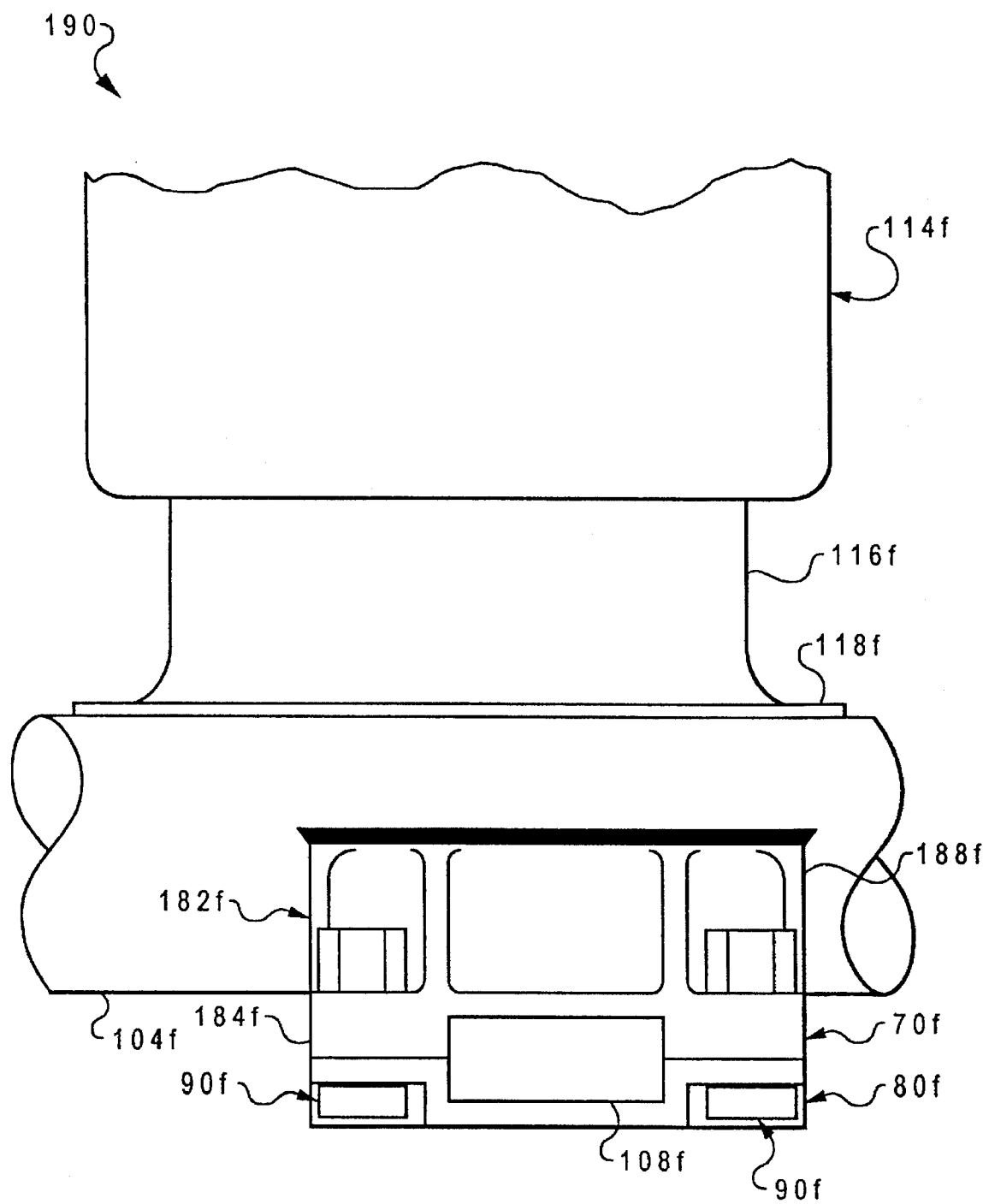
FIG. 11 is a rear elevational view of the second spring beam suspension system, showing a first alternate configuration thereof.

Referring additionally now to FIG. 11, a rear elevational view is representatively illustrated of a suspension system 190 embodying principles of the present invention. In the following detailed description of the suspension system 190, elements thereof which are similar to previously described elements are indicated with the same reference numerals, with an added suffix "f".

The suspension system 190 utilizes an axle seat 182f which is similar to the axle seat 182 shown in FIG. 10, but which has the axle 104f disposed vertically between the body 184f and the adapter plate 118f of the air spring 114f. Thus, the suspension system 190 is similar to the suspension system 120 shown in FIG. 6, but utilizes the axle seat 182f therein.

The body 184f is welded to the axle 104f at end portions 188f (only one of which is visible in FIG. 11), thereby inverting the axle seat 182f relative to the axle 104f as compared to axle seat 182 and axle 104e shown in FIG. 10. The axle seat 182f is accordingly positioned vertically beneath the axle 104f.

The adapter plate 118f is rigidly attached vertically above the axle 104f. Various means may be utilized for attaching the adapter plate 118f to the axle 104f including, but not limited to, fastening to a suitable bracket (not shown) affixed to the axle, welding to the axle, etc.

Additionally, although each of the above described suspension systems 100, 120, 130, 150, 170, 180, 190 embodying principles of the present invention have been described wherein the axle seat bodies 62, 62a, 62b, 62c, 62d, 184, 184f, respectively, are press fit and/or welded to the axles 104, 104a, 104b, 104c, 104d, 104e, 104f, respectively, it is to be understood that other means of attaching the axle seat bodies to the axles may be utilized without departing from the principles of the present invention. For example, U-bolts or other fasteners may also be used in addition to the above-described attachment means.

The foregoing detailed description is to be clearly understood as being given by way of illustration and example only, the spirit and scope of the present invention being limited solely by the appended claims.

What is claimed is:

1. A device for coupling an axle to a spring beam in a suspension system of a vehicle, the axle extending generally transverse to a direction of travel of the vehicle and having a vertical midpoint on an external surface thereof, the device comprising:

a generally tubular body having interior and exterior side surfaces, said body interior side surface being complementarily shaped to receive the axle cooperatively therein;

a generally planar first plate integrally formed with said body, said first plate being tangentially attached to said body exterior side surface, and said first plate further having a first series of spaced apart openings formed therethrough;

a generally planar second plate having a second series of spaced apart openings formed therethrough, each of said second series of openings being axially aligned with one of said first series of openings, and said second plate engaging said first plate to thereby form an elongated aperture therebetween, said aperture being shaped to complementarily receive the spring beam therein; and a plurality of fasteners, each of said fasteners extending into an axially aligned pair of said first and second openings to thereby fasten said first plate to said second plate.

2. The device according to claim 1, further comprising a rib, said rib being integrally formed with said first plate and said body, and said rib extending from said body exterior side surface to an outer edge of said first plate.

3. The device according to claim 1, wherein said first plate further has a recess formed thereon, and further comprising a deformable pad, said deformable pad being received in said recess such that said deformable pad faces said aperture.

4. The device according to claim 1, wherein said second plate further has a recess formed thereon, and further comprising a deformable pad, said deformable pad being received in said recess such that said deformable pad faces said aperture.

5. The device according to claim 1, wherein said body further has a port formed therethrough from said interior side surface to said exterior side surface, said port permitting said body to be welded to the axle at the vertical midpoint.

6. The device according to claim 1, wherein the suspension system further includes an air spring, and wherein said second plate further has an exterior surface formed thereon, the air spring being attachable to said second plate exterior surface.

7. The device according to claim 1, wherein the suspension system further includes an air spring, and further comprising a third plate, said third plate being integrally formed with said body and positioned opposite said body from said first plate, said third plate having an exterior surface formed thereon, and the air spring being attachable to said third plate exterior surface.

8. A suspension system for suspending a vehicle frame relative to an axle, the suspension system comprising:

a bracket mountable to the vehicle frame;

a bushing received in said bracket and fastened thereto;

a spring beam pivotably attached to said bushing; and an axle seat, said axle seat including a body having interior and exterior side surfaces, said body interior side surface being complementarily shaped to cooperatively receive the axle therein, a first plate integrally formed with said body, said first plate being tangentially attached to said body exterior side surface, and a second plate engaging said first plate to thereby form an elongated aperture therebetween, said aperture complementarily receiving the spring beam therein.

9. The suspension system according to claim 8, wherein said spring beam has a projection formed thereon, and wherein said aperture has a recess formed thereon to complementarily receive said projection therein.

10. The suspension system according to claim 8, wherein said first and second plates are maintained in contact with each other and in clamping engagement with said spring beam by a fastener.

11. The suspension system according to claim 8, wherein said first plate has a first channel formed thereon, and wherein said second plate has a second channel formed thereon, said first and second channels forming said aperture when said first plate engages said second plate.

12. The suspension system according to claim 8, wherein said second plate has a generally flat outer surface formed thereon and a recess formed on said second plate outer surface, and further comprising a fastener having a head portion, said fastener clampingly securing said second plate to said first plate, and said fastener head portion being cooperatively received in said recess.

13. The suspension system according to claim 12, further comprising an air spring, said air spring being attachable to the vehicle frame, and said air spring being mounted to said second plate outer surface.

14. The suspension system according to claim 8, wherein the axle has an outer side surface and a vertical midpoint thereon, and wherein said axle seat body further has an opening formed therethrough, said opening being alignable with the axle vertical midpoint.

15. A suspension system for a vehicle having a frame and a road-engaging portion, the road-engaging portion having an axle transversely disposed relative to a direction of travel of the vehicle, the suspension system comprising:

a hanger mountable to the vehicle frame;

a bushing received in said hanger and secured thereto;

a spring beam pivotably attached to said bushing;

an air spring mountable to the vehicle frame; and means for intersecuring said air spring and said spring beam, said intersecuring means being couplable to the axle.

16. The suspension system according to claim 15, wherein said intersecuring means comprises an axle seat, said axle seat including a tubular body having interior and exterior side surfaces, said body interior side surface being complementarily shaped to cooperatively receive the axle therein, a first plate integrally formed with said body, said first plate being tangentially attached to said body exterior side surface, and a second plate engaging said first plate to thereby form an elongated aperture therebetween, said aperture being shaped to complementarily receive the spring beam therein.

17. The suspension system according to claim 16, wherein said axle seat further includes a third plate integrally formed with said body, said third plate having a generally planar external side surface formed thereon, and said air spring being attached to said third plate external side surface.

18. The suspension system according to claim 15, wherein said intersecuring means includes deformable means for engaging said spring beam.

19. The suspension system according to claim 15, wherein said intersecuring means includes a channel formed thereon, said channel being shaped to complementarily receive said spring beam therein.

20. The suspension system according to claim 15, wherein said intersecuring means permits said axle to be coupled vertically intermediate said spring beam and said air spring.

* * * * *